N. RENNER.
VEHICLE WHEEL.
APPLICATION FILED NOV. 16, 1918.

1,345,506.

Patented July 6, 1920.
2 SHEETS—SHEET 1.

INVENTOR
Nick Renner.
BY Oscar Geier
his ATTORNEY

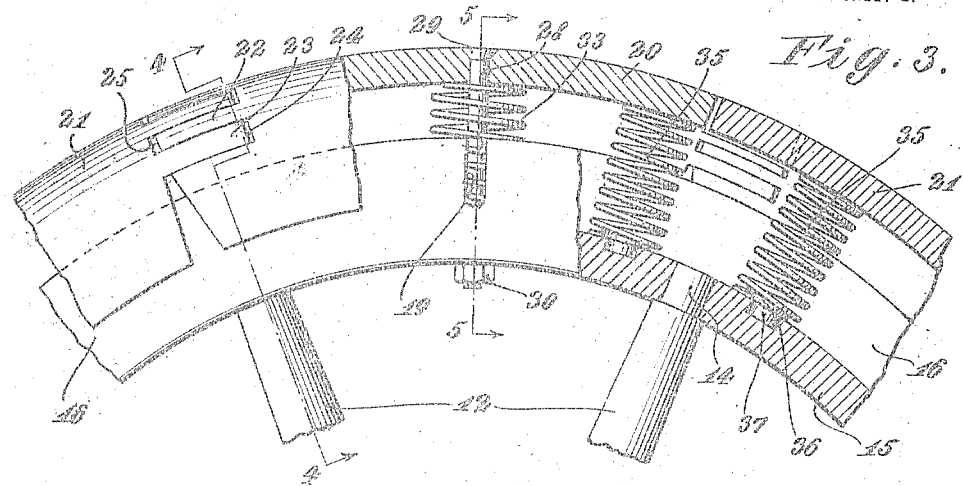
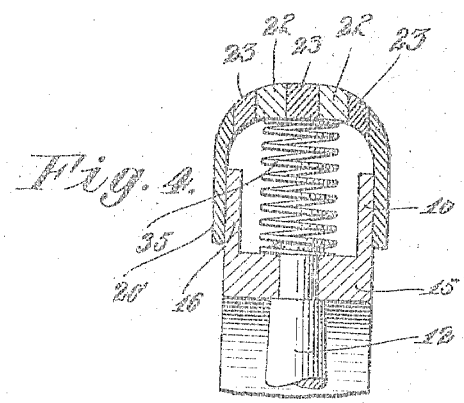
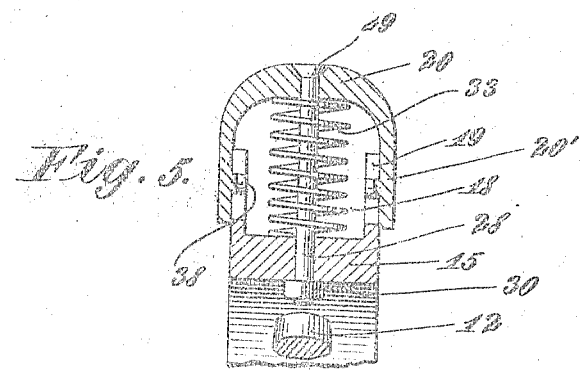

UNITED STATES PATENT OFFICE.

NICK RENNER, OF DEFIANCE, OHIO.

VEHICLE-WHEEL.

1,345,506.   Specification of Letters Patent.   Patented July 6, 1920.

Application filed November 16, 1918. Serial No. 262,784.

*To all whom it may concern:*

Be it known that I, NICK RENNER, a citizen of the United States, residing at Defiance, county of Defiance, and State of Ohio, have invented certain new and useful Improvements in Vehicle-Wheels, of which the following is a specification.

This invention relates to improvements in vehicle wheels and particularly to types adapted to act resiliently when passing over obstructions.

The principal object of the invention is to provide a wheel in which the tread is formed in relatively short sections, so constructed that the sections may move independently of those adjacent, the sections being normally held outward by powerful springs interposed between them and a rigid rim carried by the spokes.

A further object is to provide a vehicle wheel which presents no objectionable or unusual appearance from the exterior, and which materially contributes to the ease and comfort of the riders, the vehicle moving without shock or jar even if the road be rough or irregular.

These and other like objects are attained by the novel construction and combination of parts hereinafter described and shown in the accompanying drawings, forming a material part of this specification, and in which:—

Fig. 3 is an enlarged fragmentary view, partially in section, showing a modified construction and arrangement of the parts.

Fig. 4 is a transverse sectional view taken on line 4—4 of Fig. 3, and,

Fig. 5 is a similar transverse sectional view taken on line 5—5— of Fig. 3.

Figure 1:
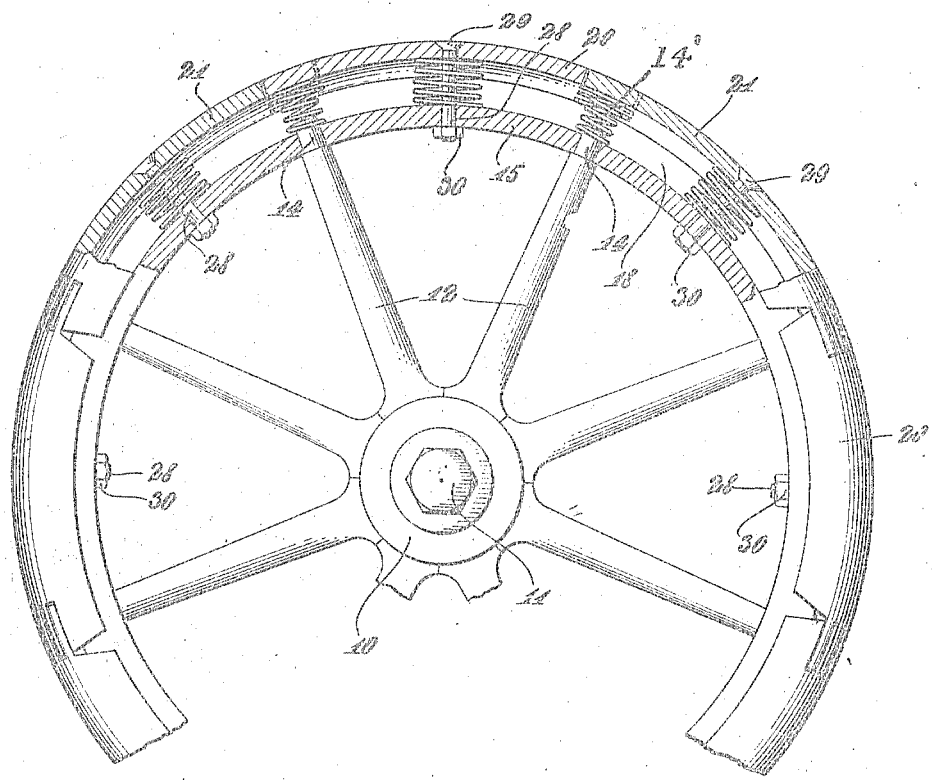
Figure 1 is a fragmentary side elevational view showing a wheel made in accordance with the invention, parts being broken away in order to disclose the interior.
Figure 2:
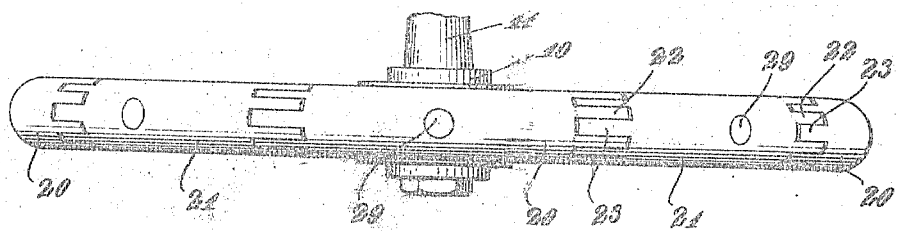
Fig. 2 is a top plan view of the same.

Referring to the drawings, the wheel will be seen to consist of a hub 10, mounted upon an axle 11, in any preferred manner, and provided with radiating spokes 12, which are firmly secured within the hub in an ordinary manner, and carried at their shouldered outer ends 14 is a rigid rim 15 having lateral outstanding flanges 16, forming an annular circumferential trough-like chamber 18, the walls or flanges 16, being radially recessed at intervals forming slots 19, for purposes hereinafter described.

The inner ends of spiral springs 14' engage the shouldered outer ends of the spokes 12 and rest with their outer ends against the inner surfaces of sectional tread elements 20 and 21 which are arranged circumjacent to the rim 15 and are curved in conformity with the rim and provided at their ends with extending tenons 22 and 23, the same being receivable in corresponding mortises 24 and 25, formed between the tenons on the adjacent ends of the next succeeding sections, the sides of the tenons and mortises being at right angles with the axis of the wheel, thereby permitting each of the sections to move independently of those immediately adjacent.

Passing centrally through each of the sections is a bolt 28 having a conical head 29 set flush with the periphery of the tread, the inner threaded ends of the bolts passing through corresponding openings formed in the rim 15, and are secured by nuts 30 in position.

In the modified construction illustrated in Figs. 3, 4 and 5, coiled compression springs 33 encircle the stems of the bolts 28, and abut against the outer surface of the rigid rim 15 at one end and the center of the tread elements 20 and 21 at the other end, other springs 35 being disposed in like manner at the ends of the tread elements, these springs 35, being held in position by enlarged heads 36 formed with stems 37, set in the inner surface of the rim 15.

In order to guide the several sections there are carried by flanges 20' pins 38 which operate within the slots 19 of the flanges 16, as can be best seen in Fig. 5, the pins preventing creeping or longitudinal movement of the tread section relative to the rim, but permitting them to move inward toward the axis of the wheel.

Having thus described my invention what I claim as new and desire to secure by Letters Patent, is:—

In a vehicle wheel having a plurality of flanged segmental tread elements circumjacent to the rim thereof, the combination of a hub having spokes radiating therefrom provided with shouldered outer ends, with a rigid flanged rim secured at the ends of said spokes, coiled compression springs secured to the shouldered outer ends of said spokes and resting against the inner faces of the tread elements, bolts having conical heads set flush with the periphery of the tread and passing through openings formed in said rim between each pair of spokes, nuts at the inner ends of said bolts for securing them in position, springs surrounding said bolts between said tread and rim, substantially as described and for the purpose set forth.

In testimony whereof I have affixed my signature.

NICK RENNER.